United States Patent
Moritzen et al.

(10) Patent No.: US 9,003,390 B2
(45) Date of Patent: Apr. 7, 2015

(54) AUTOMATIC SELF-TEST METHOD FOR MEDICAL DEVICES

(71) Applicants: Klaus Moritzen, Möhrendorf (DE); Dieter Ortlam, Erlangen (DE)

(72) Inventors: Klaus Moritzen, Möhrendorf (DE); Dieter Ortlam, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/627,336

(22) Filed: Sep. 26, 2012

(65) Prior Publication Data
US 2013/0086573 A1    Apr. 4, 2013

(30) Foreign Application Priority Data
Sep. 30, 2011   (DE) .......................... 10 2011 083 887

(51) Int. Cl.
*G06F 9/44* (2006.01)
*G06F 9/445* (2006.01)

(52) U.S. Cl.
CPC ....................................... *G06F 8/65* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 6,360,362 B1* | 3/2002 | Fichtner et al. | 717/168 |
| 8,392,902 B2* | 3/2013 | Reinz | 717/168 |
| 2007/0129906 A1* | 6/2007 | Stoecker et al. | 702/108 |
| 2008/0168434 A1* | 7/2008 | Gee et al. | 717/173 |
| 2008/0184219 A1* | 7/2008 | Matsumoto | 717/170 |
| 2012/0054734 A1* | 3/2012 | Andrews et al. | 717/171 |

OTHER PUBLICATIONS

Dunn, R.: Windows Update Agent force script, email results version 2.6; A VBScript script in the WSUS category, 2009. URL: http://community.spiceworks.com/scripts/show/82-windows-update-agent-force-script-email-results-version-2-6, Archiviert in http://www.archive.org am Oct. 16, 2009 [abgerufen am May 30, 2012]; Others.
German Office Action for German Application No. DE 10 2011 083 887.2.

* cited by examiner

*Primary Examiner* — Don Wong
*Assistant Examiner* — Reshaun M Finkley
(74) *Attorney, Agent, or Firm* — Harness, Dickey & Pierce P.L.C.

(57) ABSTRACT

A computer-implemented method is disclosed for validating an operating system patch, along with a computer program product and a patch module. After output of an operating system patch an automatic self-test is executed on the medical device at application level, which tests whether the installed operating system patch was able to be successfully installed. In this case a validation signal is output. The self-test is executed directly on the application system.

16 Claims, 3 Drawing Sheets

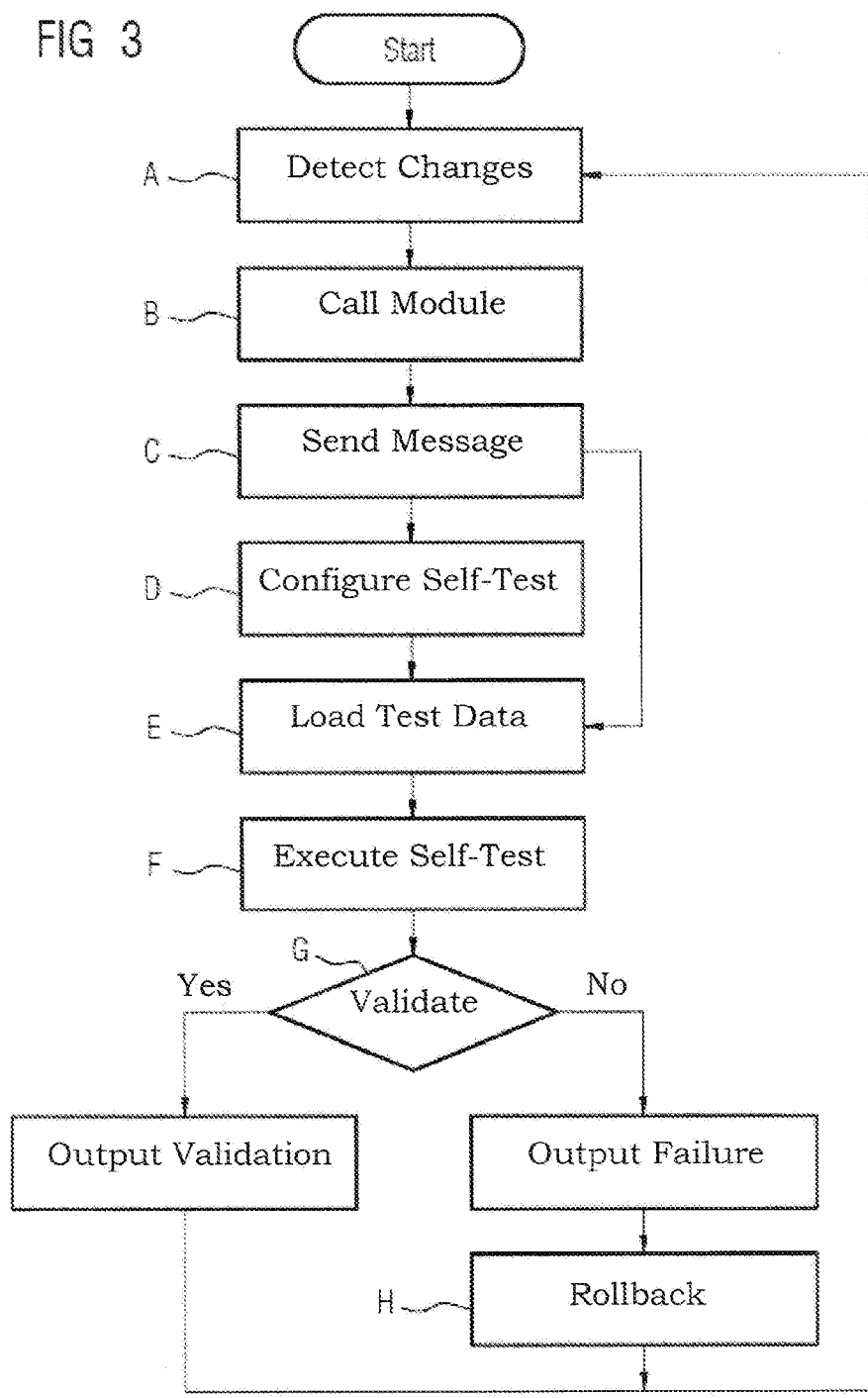

AUTOMATIC SELF-TEST METHOD FOR MEDICAL DEVICES

PRIORITY STATEMENT

The present application hereby claims priority under 35 U.S.C. §119 to German patent application number DE 10 2011 083 887.2 filed Sep. 30, 2011, the entire contents of which are hereby incorporated herein by reference.

FIELD

At least one embodiment of the present invention lies in the areas of medical technology and electronics or information technology respectively. At least one embodiment of the invention relates especially to an approach to security testing of medical devices which are controlled in their entirety or module-by-module by software or to closing security gaps which render said devices vulnerable to attack or would compromise device functionality.

BACKGROUND

Medical devices, such as medical devices for diagnostic imaging methods or devices within the framework of a colonoscopy, laboratory devices, ultrasound devices, magnetic resonance tomographs or other medical imaging devices for example, are currently controlled as a rule by software and comprise an operating system or a specific layer of an information technology infrastructure which serves as a distribution platform for application-related services (e.g. middleware such as CORBA, .NET or RPC).

In the prior art a three-part arrangement is provided with respect to the underlying systems:

First of all there is the manufacturer of the operating system or of the respective middleware, who usually markets commercial software products. Secondly there is the manufacturer of medical devices (Siemens, GE etc.), who manufactures the devices and equips with software based on the operating system and supplies them to clinical facilities. Thirdly there are the clinical facilities (hospitals, medical practices etc.), which then use the medical devices.

Because of generally legally-based regulations (e.g. in the USA: FDA, Food and Drug Administration) it is necessary for the medical devices in use to be constantly monitored for compliance with security regulations. To this end it is necessary for it always to be ensured that the newest software version of the operating system is uploaded to the device. For this purpose there is provision for the operating system manufacturer to create and deliver so-called patches, i.e. corrected versions of the software. These patch deliveries must then be validated by the device manufacturer. Previously the operating system manufacturer delivered the patches to the device manufacturer, who validated said packages for reliability. Only after the reliability of the patches could be tested could the patch be delivered to the medical facility (e.g. hospital) which generally leads to considerable delays. Disadvantageously this patching was done manually by system engineers working for the manufacturer of the medical technology devices.

After manual checking the device manufacturer was obliged to inform all customers about a new patch and to issue these to the customers (i.e. hospitals). A significant disadvantage of the previous method is thus its very considerable duration and the involvement of different institutions (which in its turn brings with it an additional requirement for exchange of data). After issuing of the patches it was necessary to initially wait for the device manufacturer to validate the patch. Furthermore there had to be a wait for the device manufacturer to pass on the patch to its customers, who then send a manual check and confirmation signal to the manufacturer, who subsequently, especially in the case of an error, could possibly in their turn inform the operating system manufacturer. It goes without saying that time delays result here when a delay occurs in an element of the aforementioned chain.

SUMMARY

At least one embodiment of the present invention discloses a technical implementation with which the testing of operating system patches for medical technology devices can be accelerated, improved and carried out in a more error-free manner.

At least one embodiment of the present invention is directed to a computer-implemented method, a computer program product and/or a patch module.

At least one embodiment of the invention is described below on the basis of the method. Embodiments, alternative solutions, further features and advantages mentioned here are likewise also to be transferred to the other solutions of the said task (i.e. to the computer program product and to the patch module). Consequently the subclaims, which are also formulated and described for the method, are also to be transferred to the arrangement and to the computer program product and vice versa. In this case the respective functional features of the method are implemented by corresponding microprocessor modules or hardware modules which are embodied to take over the respective functionality.

In accordance with one aspect of an embodiment of the invention relates to a computer-implemented method for validating at least one operating system patch of an application which is implemented on a medical technology device, comprising:

Provision of a patch module on the medical device, with this step also being able to be executed in advance, in a configuration phase;

Issuing of an operating system patch by an operating system manufacturer;

Receipt of the operating system patch by the patch module; and

Execution by the patch module of an automatic self-test on the medical technology device based on the received operating system patch and sending of a validation signal if the result of the self-test is successful.

At least one embodiment of the invention also relates to a computer program product which can be loaded into a memory of a digital computer and comprises software routines with which the steps in accordance with the aspects mentioned here which are described in connection with at least one embodiment of the method can be executed.

Furthermore at least one embodiment of the invention relates to a patch module for a medical device on which an application for controlling the medical device is implemented, wherein the patch module is intended for execution of an automatic self-test if an operating system patch has been installed on the medical device or on an application system and wherein the patch module is intended for validation of the operating system patch and for output of a validation signal in the event of a successful self-test result.

BRIEF DESCRIPTION OF THE DRAWINGS

The features, preferred and alternative embodiments, characteristics and advantages of the invention described above are explained in greater detail in conjunction with the description given below of the example embodiments, which is to be read in conjunction with the drawings, in which:

FIG. 2 shows a schematic diagram of a medical device with a patch module and FIG. 3 shows a flow diagram in accordance with a method according to an example embodiment of the invention.

DETAILED DESCRIPTION OF THE EXAMPLE EMBODIMENTS

Figure 1:
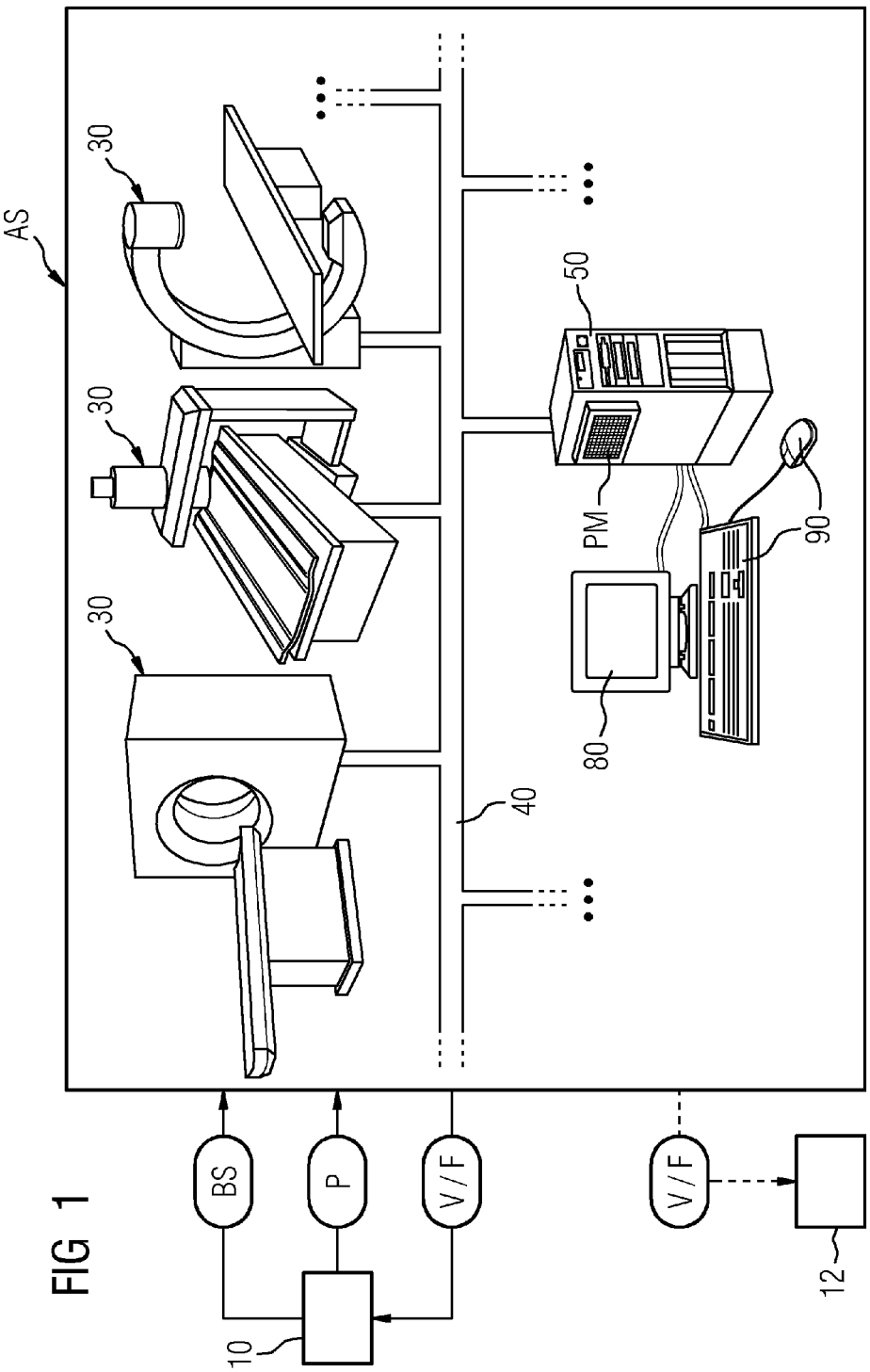
FIG. 1 shows an overview of different systems within the framework of an example embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used within the context of this application is explained in greater detail below.

In accordance with one aspect of an embodiment of the invention relates to a computer-implemented method for validating at least one operating system patch of an application which is implemented on a medical technology device, comprising:

Provision of a patch module on the medical device, with this step also being able to be executed in advance, in a configuration phase;

Issuing of an operating system patch by an operating system manufacturer;

Receipt of the operating system patch by the patch module; and

Execution by the patch module of an automatic self-test on the medical technology device based on the received operating system patch and sending of a validation signal if the result of the self-test is successful.

At least one embodiment of the method is generally computer-implemented. In such cases it can be that specific method steps are part of a microprocessor solution and are thus hard-wired while other sections of the method are embodied as software. In this case only individual sections or parts of the method would be software-implemented. As a rule all or selected sections of the method are binary-coded or are present in digital form. In this case all or individual sections of the method can be provided as source code, as already compiled code (machine code) or as interpretable code (e.g. in the interpreter languages Python, PHP, Ruby) and are interpreted by means of an interpreter (e.g. Jit Compiler). For the execution of the inventive method and the further products claimed, the programming language in which the software is available (e.g. C++, Java, Perl or PHP etc.) is of no significance. What is significant is that the software is bound directly as part of a technical system into the technical device and is used there for controlling patch uploads. The parts of the inventive method which are implemented in software can be parts of a so-called "embedded system", which is embedded in the surrounding medical technology system and interacts with the latter.

The medical technology system generally involves a medical device (e.g. laboratory device, medical device for diagnostic imaging methods, but also simpler devices such as for example devices for measuring physiological parameters of the patient), which is controlled via an application. Usually an application comprises a user interface, via which the user can operate, control and/or check the medical technology device by means of the application.

Inventively a distinction is made in at least one embodiment between two basically separate entities:

An entity of the operating system manufacturer and an entity of the application system. The entities are embodied at least partly computer-based.

The first entity is usually the operating system manufacturer (e.g. a manufacturer of so-called off-the-shelf systems, e.g. operating systems such as UNIX or derivatives, such as Solaris etc.). The "entity" of the operating system manufacturer should also be understood as a computer network comprising different computer-based units, chips and modules, especially a computer-based module used for publishing operating system patches. The type of operating system is basically independent of the implementation of the inventive solution. Thus operating systems such as UNIX, MacOS, Windows systems, JavaOS—or netware—or other middleware systems can be used. In such cases it is possible for the operating system patch to be published by an operating system manufacturer (such as HP, IBM, Sun-Microsystems, Apple, Microsoft for example) or it is likewise possible for the operating system patch to be published by a number of operating system manufacturers and thus by a combination of a number of operating system manufacturers or by an entity assigned to the operating system manufacturer.

On the other side there is the application system. This is likewise to be understood as a computer-based system constructed from a number of entities and in which the operating system with the respective patches is used. Within the framework of an embodiment of this invention the application system involves a medical technology system including interacting components and comprising inter alia a plurality of technical devices. At this point it should be explicitly stated that devices referred to as a "medical device" below, include without exception technical devices or systems (e.g. perfusors, imaging apparatuses, postprocessing systems etc.). Depending on the application it is possible that the medical device that is delivered to the customer (e.g. to the clinical facility) is not suitable for all customers but will be configured locally to the respective requirements. The manufacture of the respective medical device carries out adaptations (configurations) on the software and on the hardware for this purpose so that the medical device can be provided tailor-made for the respective application. The important aspect is that the operating systems, even after delivery, still have to be adapted to current circumstances, especially to security gaps allowing attacks via the Internet. To this end there is provision for patches to be delivered to customers of the operating system in order to close security gaps. In such cases the entire, complete operating system is not replaced but only parts thereof are newly implemented, which serve to close security gaps.

The operating system patches are available as a rule as executable code and can be provided at fixed configured time intervals or on demand by the operating system manufacturer.

Basically a distinction is made between the updates provided by the operating system manufacturer in respect of their functionality. Inventively the operating system patches comprise all such operating system updates which serve to plug security gaps in the use of the operating system in the medical device (e.g. as an embedded system). This includes so-called hot fixes which serve to repair important and urgent errors. In an alternative embodiment of the invention the operating system patch can also relate to such updates which involve an expansion of the functionality of the previously delivered operating system (e.g. expanded protection against malware, comprising viruses, worms and other Internet attacks). In a further advantageous embodiment of the invention the operating system patches also include so-called bug fixes which are designed to correct previous errors in the operating system, which for their part could trigger malfunctions in the medical device.

The operating system patch can be provided on the system of the operating system manufacturer for download (via an appropriate communication link, e.g. via the Internet) or is transferred directly from the system of the operating system manufacturer to their customer and inventively forwarded directly to the application system comprising the medical device (e.g. a clinical facility or a group of medical practices etc.) (and no longer—as in the prior art—first of all to the device manufacturer, who must then validate the patch and can only forward this to the application system after successful validation).

In accordance with one embodiment an operating system patch is provided as an individual module. As an alternative it is possible to combine a number of operating system patches and forward them as a patch package. Conversely—especially with extensive patches—the patches can also be divided into one or more packages.

Embodiments of the invention are basically not restricted to the operating system patch being issued directly by the operating system manufacturer. It is fully conceivable for the issue of operating system patches to be outsourced to other entities. However the publishing of the operating system patches is always undertaken by a system that is assigned to the operating system manufacturer. Usually the operating system itself and the operating system patches are provided by the same entity.

The medical device involves a technical device which is used in the medical sphere, such as a laboratory device, a medical device for diagnostic methods, especially for imaging methods, medical devices with electronic chips which in their turn are based on the operating system for example. Depending on the application the medical device can also be an apparatus on which an operating system is implemented, such as e.g. an x-ray apparatus, nuclear medical apparatuses, but also more comprehensive systems such as PACS systems and products based thereon (PACS—Picture Archiving and Communications System). The medical devices are used to execute various measures, such as collection of measurement data, recording of physiological date or acquisition of image data in imaging devices (e.g. computed tomography, magnetic resonance tomography, positron emission tomography, ultrasound devices etc.). Likewise the method can also be used explicitly for such medical devices as are designed for restricted medical data capture such as for recording image data for diagnosis of coronary artery diseases (CAD), as well as for presenting the recorded data, such as for presenting plaque or other deposits in blood vessels to detect arteriosclerotic vessel constrictions for example. Other specific applications here for example are virtual colonoscopy for recording slice images of the colon in order to create two or three-dimensional image data of the colon from these images, in order on this basis to diagnose diseases (e.g. polypses, diverticula or tumors etc.). A further application relates to magnetic resonance, e.g. the syngo.via-system from Siemens for image-based diagnosis in neurology, comprising a quantitative processing of neurological data, especially perfusion data, images relating to the cerebral blood distribution, (e.g. cerebral blood flow—CBF, cerebral blood volume—CBV and further measurement data or images).

The term "patch module" is intended to be understood as a unit which can be implemented in software or alternatively is defined as part of an embedded system and which is intended for the medical device for receiving the operating system patches. The patch module exchanges data with other units of the medical device, such as input/output units, measurement data detectors, processor units such as the CPU (central processing unit), memory units etc., as well as exchanging data with the system of the operating system manufacturer. Optionally a communication link (usually a bidirectional link) is provided with the manufacturer of the medical device. The patch module serves on the one hand to receive the operating system patches and to implement the patches in the installed operating system on the medical device. A further functionality of the patch module lies in automatically implementing the received operating system patch on the device. Preferably this can also be executed at runtime of the device, even during the operation of the medical device. On the other hand the patch module serves to carry out the automatic self-test. The patch module can be provided in advance in a configurations phase on the application system.

The term "automatic self-test" relates to a testing mechanism which usually comprises a number of stages and sections. The self-test is executed on the medical device and on the basis of the received and installed operating system patch. It will also be initiated, called or instigated directly on the medical device by way of the patch module installed there. Preferably there is provision for the self-test to be executed fully automatically, i.e. without any user interaction with a system administrator. As soon as it is recognized that the operating system has been changed on the application system/on the medical device, the execution of the self-test is initiated automatically. As an alternative there can be provision for a confirmation signal of the user/administrator to be required here. This can be sensible if the medical device is also used for implementing life-support measures (e.g. ventilator). Then it is necessary for the user to confirm through a confirmation signal that a test of the newly installed operating system patch can now be performed without the performance or functionality of the medical device being restricted. This is intended to ensure that the medical execution sequence using the respective medical device (for life-support measures for example) is not adversely affected.

In accordance with an example embodiment of the invention there is provision for the automatic self-test to implement a "trial operation" of the respective medical device. "Trial" means that the device is still operated by the user as in normal operation, but with trial or test data. Operation per-se makes no distinction between operation of the device in real use and in trial operation. The important aspect in this case is that the medical device is operated precisely in the way provided for by clinical use, i.e. also with the specific configurations and application-specific adaptations provided there. The only change lies in the fact that test data is used. The test data can involve pre-processed or edited image data, pre-processed measurement data or other test data. Otherwise the sequence of the medical device during the self-test is identical to its usual execution in the real, clinical environment. The advantage of this approach is to be seen as not only standard cases being tested but that the self-test lies as "close" as possible to the real execution sequence or clinical use. The automatic self-test is designed so that the medical device with the respective applications is executed (a number of applications can also be implemented and executable on a medical device). If for example the medical device involves a computer tomography system for executing a virtual colonoscopy and for presenting the respective images, test images are provided as input (input variables) for the application during the self-test. The application for presenting the images is then executed on the basis of the test images. The result of the respective trial or test operation which is obtained by the self-test is compared for a match with a reference result. If the self-test result matches the reference result the self-test is deemed to be successful. In this case a validation signal is generated which is designed to indicate a successful self-test. The validation signal can be a digital signal (e.g. a flag for a transferred data record) or an acoustic and/or optical signal. The validation signal can be forwarded to other entities for further processing, e.g. to the system of the system manufacturer and/or to the system of the device manufacturer. Thus an important advantage is obtained in that the self-test is able to be executed in the current environment of the medical device, i.e. also in the form in which the medical device is bound into the application system. In such cases application-specific parameters are also taken into account which are only relevant locally (i.e. in the application system) (such as network connections/bandwidth of the data transmission, processor capacitors, technical resources, parallel operation of a number of applications on the medical device, parallel operation of a number of medical devices in the application system, data volumes of the generated image data for imaging devices etc. for example).

In accordance with an example embodiment of the invention the automatic self-test is executed using a user interface of the medical device. This produces the further advantage of the self-test also being able to be executed in the real environment with typical inputs and command sequences and of the same user interface being used as the respective application.

An important feature is characterized by the fact that the automatic self-test is executed at application level. This enables specific parameters and conditions of the application system to be taken into account. If the application has been configured on the medical device for an actual, specific application case, it is automatically ensured that the automatic self-test is executed in the same configured application environment. This enables the quality of the test result to be improved. The test comprises a sequence of processing steps which are usually executed on the medical device. Examples of test steps are as follows:

Loading of image data, processing of image data, presentation of the image data and execution of user interactions at the user interface for modified presentation of the image data and/or to change the presented image data (e.g. annotation, deletion, modification, storage etc.). The user interactions can also be simulated. For simulation of user interactions the checking protocol can simulate keyboard entries and mouse clicks in the manner of a real user.

Usually the patch module is implemented at the same time as the application on the medical device. As an alternative it is possible for the patch module to be implemented at a later time or separately from the application on the medical device.

A further aspect of at least one embodiment of the invention is to be seen in the fact that all or selected states of the application are retained or stored on the medical device. An audit log file can be provided for this purpose. It can thus be ensured that the state before an installation of the operating system patch is always stored. This has the advantage of enabling a "rollback", i.e. a restoration of the old system state before installation of the operating system patch to be carried out, if the automatic self-test could not be validated successfully (no validation signal). This enables it to be ensured that normal operation of the medical device is not adversely affected by execution of the operating system patch. If the installation of the patch on the medical device encounters an error, the status before installation of the patch can be automatically restored. This increases the security of the medical device.

As already mentioned above, there is provision for the automatic self-test to be executed directly in the application system and immediately under the control of the application with which the medical device is controlled and/or operated. This has the advantage of also enabling application-specific and/or device-specific parameters (which are relevant for the function of the medical device and/or the application) to be taken into consideration in the self-test. This means that it is possible for device-specific or application-specific configuration tests to be covered as well. Usually there is namely provision for a device manufacturer, on delivery of a medical device (with the respective application(s)), to undertake application-specific configurations (e.g. building in a larger memory chip if high volume datasets are to be stored or providing a faster data connection if a high volume of data is to be transferred or providing a graphic user interface if text input/output is not sufficient). With the inventively provided automatic self-test, these application-specific and/or device-specific configurations and adaptations can also be tested with the self-test.

In an example embodiment the operating system patch is forwarded directly from the system of the operating system manufacturer (either directly from the operating system manufacturer or from a third party which is assigned to the operating system manufacturer) to the medical device. The provision or forwarding of the operating system patch can be executed in accordance with the PUSH principle or in accordance with the PULL principle. With the PUSH principle the operating system manufacturer actively pushes newly generated operating system patches to the application system, while with the PULL principle the application system detects by requests to the system of the operating system manufacturer whether the new operating system patches are present and actively retrieves these patches. Preferably the operating system patch is sent directly to the patch module of the medical device. In this case each medical device on which an application is implemented is equipped with a patch module. As an alternative it is also possible for the patch module to be sent to a central entity of the application system, from which it is distributed to the individual applications and/or medical devices. The latter variant is then sensible if the application system has a central administrator who can undertake these tasks for a plurality of connected medical devices of an encompassing application system (e.g. a clinic or a clinic network). The self-test is initiated and controlled by the patch module. The self-test is preferably embodied as a software test. It comprises patch module-side sections (i.e. method sections which are executed on the patch module) and device-side sections (i.e. method sections which are executed on the medical device) and can be constructed in accordance with the client-server principle.

In a more complex embodiment there is provision for the automatic self-test which is executed on the patch module and on the medical device to comprise yet further functionalities. In this case there can be provision for an error message to be output automatically and if necessary forwarded to further entities if the self-test could not be concluded successfully (i.e. if no validation signal can be output). In such cases it can be set that a rollback, i.e. a restoration of the state before installation of the operating system patch, is undertaken. Otherwise the rollback can also only be executed in response to a rollback signal which is entered by a user via a user interface. 1Furthermore it is possible for the self-test to be able to be configured for the respective application case. For example repetitions can be provided here, so that the self-test is run repeatedly at different points in time under different application conditions. As an alternative parallel tests or time-offset tests can be executed on medical devices which are connected to the application system. Furthermore it is possible for a scope of the self-test to be able to be configured in advance. It is thus conceivable for example that with a minimum setting only a greatly reduced test for serious security deficiencies is carried out, while with a maximum setting more comprehensive tests are carried out.

An important advantage is to be seen in the fact that the automatic self-test for validating an operating system patch can be adjusted to the different medical devices. It is obvious that a laboratory device necessitates different test steps from an MRT apparatus or drive controls for the patient table of a SPECT apparatus. In accordance with an aspect of the invention a signal processing device is provided on the patch module. The signal processing device is used to automatically recognize whether changes to the application and/or to the operating system have been carried out. The signals are then evaluated and processed to the extent that the self-test is initiated under event control and/or time control.

An advantage is also to be seen in the fact that the self-test or the validation of the operating system patches can be executed in a uniform manner for all operating system application systems (i.e. all clinical devices for example which use devices which are based on the operating system), since a uniform patch module is implemented on the devices. This enables the situation to be excluded in which a first application system executes different validation measures or test measures from a second application system (which for example has more stringent or less stringent test specifications).

An advantage is also to be seen in the fact that the regular runtime behavior of the medical device is not adversely affected by the self-test.

To keep pace with all operating system patches with their validations, an audit process or log file is provided, in which all results of the executed self-test are held. In addition all operating system patches (or the different operating system versions respectively) are stored. This enables an earlier stage of the system to be restored at any time. Furthermore the execution sequence of the operating system patches can also be traced and evaluated over time.

The validation signal, the error message and/or other signals which occur within the framework of the validation of the operating system patch can be forwarded via different communication channels, comprising an e-mail notification to a predeterminable group of recipients or via electronic messages which are not sent by e-mail, as well as via other communication protocols (in addition to the HTTP protocol of the Internet) also via Bluetooth, mobile radio, proprietary interfaces etc.

In accordance with one aspect the time at which and the form in which the self-test of the patch module will be executed is also able to be configured as soon as it has been recognized that a new operating system patch is installed. On the one hand it is possible for the self-test to be executed immediately after installation of the operating system patch. As an alternative here configurable events can also be defined, which lead to the automatic initiation of the self-test. As an alternative time intervals can also be defined, after the expiry of which a self-test is to be executed (it would for example be conceivable here for the self-test to be executed where possible at times in which there are few demands on the medical device, e.g. at night). In addition events can also be configured which are designed to initiate the self-test.

This offers further flexibility and increases the quality of the application system, in that the self-test can be tailored very specifically to the respective application circumstances.

At least one embodiment of the invention also relates to a computer program product which can be loaded into a memory of a digital computer and comprises software routines with which the steps in accordance with the aspects mentioned here which are described in connection with at least one embodiment of the method can be executed.

Furthermore at least one embodiment of the invention relates to a patch module for a medical device on which an application for controlling the medical device is implemented, wherein the patch module is intended for execution of an automatic self-test if an operating system patch has been installed on the medical device or on an application system and wherein the patch module is intended for validation of the operating system patch and for output of a validation signal in the event of a successful self-test result.

The basic system for implementing an embodiment of the inventive computer-implemented method for validating at least one operating system patch is explained in greater detail below with reference to FIG. 1.

FIG. 1 shows three different computer-based systems: a system 10 of an operating system manufacturer, such as Sun Microsystems, Microsoft, IBM, Apple, Samsung etc. for example. The system 10 can be organized as a network system or as a cloud system and can comprise a plurality of subordinate entities which are networked for the exchange of data. The system 10 is used for publishing the operating system, which is distributed to a plurality of different customers. The second system relates to a device manufacturer's system 12. In the device manufacturer's system 12 medical devices 30 are developed and produced, as by the applicant for example. It also includes computer systems which exchange data with other systems, including the operating system manufacturer 10 and customers of the device manufacturer 12. The device manufacturer 12 delivers its medical devices 30 to clinical facilities, medical practices or other types of customer. The medical devices 30 are assigned to an application system AS, which is shown in the example embodiment in FIG. 1 on the right-hand side. An application system AS can for example be a clinical facility in which a plurality of different medical devices 30 are linked, which usually exchange data via a network 40 with as a rule a number of computers 50 and/or other computer-based apparatuses and/or other devices.

Usually the device manufacturer 12 adapts the medical devices 30 specifically for the respective application cases or for the respective application system AS. For this purpose they equip the medical device 30 with different components which are required for the respective application case. For example a first application context requires that the medical device 30 is equipped with a greatly enlarged memory, while a second application context equips the medical device 30 with a plurality of multicore processors, to enable the greatest possible computing power to be provided. These configurations and adaptations of the medical device 30 are however only to be understood as examples and it is obvious that other hardware modules of the medical device 30, other electronic components or other software modules can also be implemented for the medical device 30.

The medical device 30 is controlled and/or operated via an application. The application is based on an operating system BS or a middleware platform. Usually the operating system manufacturer 10 outputs the operating system BS directly to the application system AS. This is shown in FIG. 1 by the arrow which points from the box labeled with the reference character 10 to the application system AS and is labeled with the reference characters "BS" (shown in an oval).

With all current operating systems BS it is necessary to adapt the operating system BS to current security attacks and therefore to issue correction units of the operating system BS continuously and distribute them to the application systems AS. These correction measures are grouped together below as an operating system patch P. Usually the operating system manufacturer 10 also issues the operating system patch P.

Inventively there is now (and by contrast with the prior art) provision for the operating system manufacturer 10 to send the operating system patch P directly to the application system AS and no longer (as previously) to first send the operating system patch P to the device manufacturer 12.

Inventively the application system AS has also been expanded such that it is embodied for direct receipt of the operating system patch P from the operating system manufacturer 10. In accordance with a preferred embodiment of the invention each medical device 30 of the application system AS is embodied with a patch module PM. The patch module PM is used to receive the operating system patch P.

In accordance with the first variant of an embodiment of the invention the patch module PM is embodied on each medical device 30 (not shown). As an alternative it is possible not to modify each individual medical device 30 and expand it with a patch module PM but to provide the patch module PM separately from the individual medical devices 30 such that the application A, with which the respective medical device 30 is operated or controlled, can access the patch module PM. For example the patch module PM can be embodied on a central computer 50 which exchanges data via the network 40 with the respective medical device 30 (or the number of medical devices 30) on which the application A runs, which for its part is based on the operating system BS. This embodiment is indicated in FIG. 1 by the patch module PM being arranged on the computer 50. Different implementation alternatives are conceivable here. Thus it is also possible for the patch module PM to only be implemented on the computer 50 on which the application A is running, with which the medical device 30 is operated. In this case a group of medical devices 30 can also be operated by one and the same application A. As an alternative it can also be necessary for a medical device 30 to be operated by a number of applications A.

The patch module PM can be delivered together with the medical device 30 to the application system AS when the medical device 30 is delivered. As an alternative the patch module PM can also be provided at another time or separately from the medical device 30. The patch module PM can be provided on the one hand by the device manufacturer 12 and/or on the other hand by the operating system manufacturer 10.

The patch module PM serves to receive the operating system patch P. In addition the patch module PM serves to execute an automatic self-test on the respective medical device 30 on the basis of the received operating system patch P (which must already be installed at the time at which the self-test is carried out, so that it can be tested or validated). The automatic self-test is executed on the respective medical device 30 using application conditions and at application level.

As soon as a detection unit (not shown) within the application system AS detects that the operating system BS (or the middleware) has been changed, namely by installation of an operating system patch P, the self-test is automatically initiated. Depending on configuration the self-test is executed at a predeterminable time or for a predeterminable event on the medical device 30. The self-test is identified by a trial operation of the respective medical device 30 if for example the medical device 30 involved is an anesthesia system which comprises an anesthetic machine, an input/output interface (e.g. a monitor and/or a keyboard, mouse), a processor 50 for controlling the anesthetic machine and as a rule also other components, then it is vital for fault-free operation of the anesthetic system that the operating system BS, on which the control application for controlling the anesthetic machine is based, also to be protected against current security attacks (e.g. in the form of worms or viruses). To this end (generally at regular intervals) the operating system patch P is forwarded by the operating system manufacturer 10 to the patch module PM. Now it is likewise vital to ensure that the medical device 30 (in this case the anesthesia system) even after implementation of the operating system patch P continues to function without errors under the given application conditions. To this end the patch module PM on the anesthetic machine can immediately initiate and execute the self-test under application conditions. Advantageously the self-test is executed immediately on the medical device 30, e.g. anesthetic machine) under application conditions (with test data, especially with simulated patient anesthesia data).

In the self-test in this case device-specific parameters, in this case thus anesthetic machine specific parameters, are taken into account. The self-test is executed on the anesthetic machine itself and is operated here via the user interface of the medical device 30 (here: the monitor of the anesthetic machine). In this case the self-test practically simulates trial operation of the medical device 30. This usually occurs with prepared, uniform test data. The automatic self-test leads to a self-test result. For example different anesthetic gases are mixed or in another application case acquired image data are presented on the monitor 80 for diagnosis. Another application for the medical device 30 can involve for example the control for positioning the patient table in a SPECT apparatus 60 or another imaging apparatus. This example is shown schematically in FIG. 2. In this case the application system AS includes a SPECT apparatus 60, a monitor 80 and keyboard or a computer mouse 90, as well as a processor 50. In the example embodiment shown schematically in FIG. 2 only selected modules of the application system AS are shown, in order to explain the underlying principle. An application A is installed on the computer 50, via which the mechanics for positioning the patient table is controlled. The application A is based on the operating system BS. If for the operating system BS a new operating system patch P is installed on the likewise assigned patch module PM, a self-test is executed automatically for the respective application A. In this case the medical device 30 is positioning mechanics for positioning the patient table. As an alternative to the example embodiment shown in FIG. 2, it is likewise possible for the application A to be provided as an "embedded system". Then the application A is embedded or built into the positioning mechanics 30 as an electronic module.

Figure 2:
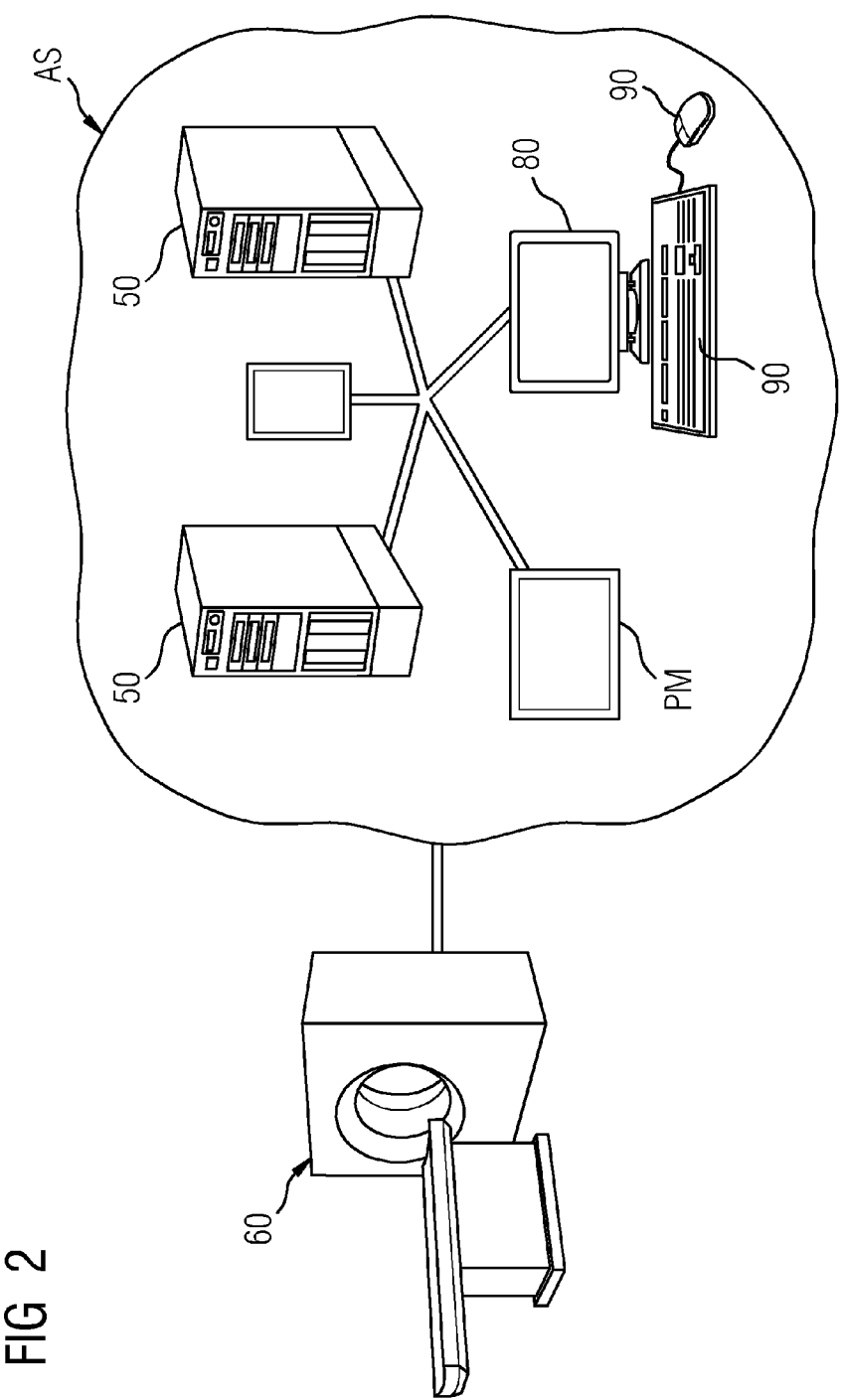

In the example shown in FIG. 2 of positioning mechanics 30 for controlling the patient table, the self-test is executed by the patient table being moved to the correct position for the different workflows of the SPECT system 60. The result here is thus the positioning of the patient table.

Basically the result of the self-test is compared with a reference result for a match. The reference result in this case is the correct position of the table, which can be detected manually or by position sensors. Thus if the self-test carried out matches the correct reference result, validation signal V is output by the patch module PM. This is shown in FIG. 1 by the arrow which points from the application system AS towards the device manufacturer 12. As an alternative the validation signal V can also be sent from the application system AS to the operating system manufacturer 10. This is shown in FIG. 1 by the dashed line labeled with the reference character V.

If the self-testing counters an error or could not be ended successfully, an error message F is output. Like the validation signal V, the error message too is forwarded to further entities, either to the device manufacturer 12 and/or to the operating system manufacturer 10.

A typical execution sequence in accordance with an example embodiment of the invention is shown in greater detail below with reference to FIG. 3.

The method begins with the step START. In this step a new operating system patch P is uploaded to the application system AS. The subsequent method which is shown below by the steps A, B, C, . . . relates to the validation of the uploaded operating system patch P.

In step A it is automatically detected whether changes to the operating system BS are present. If no changes are detected no further steps must be initiated.

Otherwise, if changes to the operating system BS have been detected, the patch module PM is called in step B.

In step C a message is sent to the medical device 30, that self-tests have to be carried out. The message can either be sent via a pop-up window appearing on the screen or via e-mail or via other messages and communication paths.

After the execution of step C the method can be continued directly with step E. As an alternative however the execution of step D is also possible. In step D the automatic self-test method is configured. The configuration of the automatic self-test can be carried out either manually, semi-automatically or fully automatically. With manual configuration the system administrator enters specific presets via the user interface of the application A. With the automatic configuration, preset configurations of the patch module PM are read in. It can be set here for example that the automatic self-test is executed after a configured time interval (e.g. at nights) or after the occurrence of configurable events (e.g. high or low data volume). Step D of the configuration can also be promoted and executed in an advance configuration phase.

In step E the test data is loaded for execution of the automatic self-test.

In depth F the self-test is executed on the medical device 30.

In step F a test result is likewise recorded for the automatic self-test. The test result depends on the respective medical device 30 or on the application A. If the medical device 30 involves a CT system for presentation of slice images, then the application A serves to present slice images. Accordingly the test result also relates to the presentation of slice images. In another application case the application A serves with the medical device 30 to present images which were recorded as part of a colonoscopy. Accordingly the test result of the automatic self-test then relates to the presentation of colonoscopy images which were simulated with test data however. Another application can relate to the postprocessing of acquired image data. In this case the result of the application and also the result of the self-test would be the successful presentation of the image data on a monitor.

The actual validation is then carried out in step G. This involves checking whether the application—as intended—also functions with the functionality provided with the new operating system patch P. This is achieved by the test result of the automatic self-test, which has been detected in step F, being compared with a reference result for a match. To all intents and purposes this checks whether the application also functions without errors and can be executed on the respective medical device 30 when the new operating system patch P has been installed.

If the comparison carried out in step G has produced a match (yes case) the validation signal V is output. Otherwise (no match between test result and reference results) an error message F is output. This error message F can if necessary also be passed on to other entities. This is shown in FIG. 3 by the arrow pointing to the right and the three points indicated. In addition to output of the error message F, a rollback is initiated in step H. Usually the rollback comprises the de-installation of the operating system patch P and the restoration of the state of the operating system BS before installation of the operating system patch P so that the application A and the medical device 30 can continue to be executed without errors and are thus able to be used within the clinical environment.

The method presented here is run repeatedly. In this case a setting can also be made in which the validation method is always run when the application system AS is started up. Otherwise a setting can be made that the method is only executed if a message has arrived which is intended to signal the output of a new operating system patch P.

It should be expressly pointed out that the sequence of the steps which have been mentioned in the example embodiment in conjunction with FIG. 3 can also be varied. It is thus possible for example for the patch module PM to have already been delivered in an installation phase at a previous time to the application system AS or to the medical device 30. Usually the patch module PM is made available at the same time as the medical device 30 to the application system AS. After this configuration phase the actual validation phase of the method is executed. In the validation phase the operating system patch P is output by the operating system manufacturer 10 and received at the patch module PM of the medical device 30. After receipt of the operating system patch P the automatic self-test can be carried out, after which, in the event of success, a validation signal V or, in the event of an error, an error message F is output.

In summary, an embodiment of the invention can be described as follows:

An embodiment of the invention makes it possible, using the user interface of the medical device 30 or of the application, to test at application level and directly on the medical device 30 whether a new operating system patch P was able to be installed successfully on the target system or application system AS with which the medical device 30 is operated. In this case a self-test is carried out on a patch module PM that is provided directly on the medical device 30. The self-test is operated at application level by the user interface of the application A and to all intents and purposes involves trial operation of the medical device 30 in a real environment under real configuration conditions.

Embodiments of the invention are basically not restricted to a specific class or a specific type of medical device 30, operating systems, patches and/or application systems. The medical device 30 can for example be a perfusor, an anesthesia perfusor, especially a double barreled two-channel perfusor for anesthetic applications, a medical device for imaging methods or for postprocessing methods. Less complex devices such as e.g. laboratory devices, blood pressure measuring devices lie within the framework of the invention. Accordingly the application is designed for operating or control of the medical device 30. The application can also have other functionalities. In this connection it is pointed out that the basic idea of the invention is not restricted to the examples described here and variants of the disclosed examples can also be derived by the person skilled in the art without departing from the scope of protection of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for validating at least one operating system patch for an application which is implemented on a medical imaging device of an application system, the method comprising:
    issuing an operating system patch by an operating system manufacturer system;
    provisioning a patch module on the medical imaging device;
    receiving the operating system patch by the patch module; and
    executing, by the patch module, an automatic self-test on the medical imaging device whose operating system has been patched, the automatic self-test simulating a clinical trial of the medical imaging device by,
        loading test data associated with the medical imaging device, driving, using the loaded test data, the medical imaging device during the clinical trial to collect clinical test data, the clinical trial being performed at a time where a patient is not situated in the medical imaging device, and determining whether the clinical operation performed by the medical imaging device whose operation system has been patched was successful by comparing the clinical test data with a reference result; and sending one of a validation signal and a fail signal based on the reference result.

2. The method of claim 1, wherein a state before installation of the operating system patch is restored upon the execution of the self-test indicating that the self-test was not concluded successfully.

3. The method of claim 1, wherein the operating system patch is sent by the operating system manufacturer system directly to the medical imaging device.

4. The method of claim 1, wherein an error message is output automatically upon the execution of the self-test indicating that the self-test was not concluded successfully.

5. The method of claim 1, wherein the at least one of the issuing and receiving of the operating system patch is executed after configurable time intervals or after configurable events.

6. The method of claim 1, wherein the automatic self-test tests the medical imaging device for security gaps which would compromise the device functionality.

7. The method of claim 1, wherein the automatic self-test is executed at least one of using the medical imaging device and using a user interface of the medical imaging device.

8. The method of claim 1, wherein at least one of the device-specific and application-specific configurations are also covered by the automatic self-test.

9. The method of claim 1, wherein the patch module is installed together with the application on the medical imaging device.

10. The method of claim 1, wherein a change to the operating system is automatically detected and evaluated for the application by the patch module, in order to initiate a self-test under time or event control.

11. A patch module for an application, via which a medical imaging device is controllable, the patch module being designed for executing an automatic self-test in accordance with the method of claim 1 upon an operating system patch being installed on the medical imaging device or on an application system and wherein the patch module serves to validate an operating system patch.

12. A computer program product, loadable into an internal memory of a digital computer, comprising software routines with which the method of claim 1 is executed upon the software routines being executed on the digital computer.

13. The method of claim 1, wherein the test data is medical image data.

14. The method of claim 2, wherein the operating system patch is sent by the operating system manufacturer system directly to the medical imaging device.

15. The method of claim 2, wherein an error message is output automatically upon the execution of the self-test indicating that the self-test was not concluded successfully.

16. A computer readable medium including program segments for, when executed on a computer device, causing the computer device to implement the method of claim 1.

* * * * *